(12) United States Patent
Lee

(10) Patent No.: US 7,052,043 B2
(45) Date of Patent: May 30, 2006

(54) TILT STEERING APPARATUS FOR VEHICLE

(75) Inventor: Byeong-Hoon Lee, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 277 days.

(21) Appl. No.: 10/649,860

(22) Filed: Aug. 28, 2003

(65) Prior Publication Data

US 2004/0251672 A1 Dec. 16, 2004

(30) Foreign Application Priority Data

Jun. 16, 2003 (KR) .................... 10-2003-0038733

(51) Int. Cl.
*B62D 1/18* (2006.01)
(52) U.S. Cl. ..................... 280/775; 74/492; 74/493
(58) Field of Classification Search ............. 280/775; 74/492, 493; B62D 1/18
See application file for complete search history.

(56) References Cited

U.S. PATENT DOCUMENTS

| 4,892,330 A | | 1/1990 | Beauch | |
|---|---|---|---|---|
| 4,903,540 A | | 2/1990 | Beauch | |
| 4,938,093 A | * | 7/1990 | Matsumoto et al. | .......... 74/493 |
| 4,949,990 A | * | 8/1990 | Hirahara et al. | ............. 280/750 |
| 5,005,862 A | * | 4/1991 | Yamaguchi | ................. 280/775 |
| 5,078,022 A | | 1/1992 | Ichikawa | |
| 5,143,402 A | | 9/1992 | Higashino et al. | |
| 5,144,855 A | * | 9/1992 | Yamaguchi et al. | .......... 74/493 |
| 5,452,624 A | | 9/1995 | Thomas et al. | |
| 5,823,062 A | * | 10/1998 | Snell et al. | .................... 74/493 |
| 6,282,977 B1 | | 9/2001 | Satoh et al. | |
| 6,305,712 B1 | * | 10/2001 | Hayashi | ...................... 280/777 |
| 6,481,310 B1 | | 11/2002 | Janeczko et al. | |

FOREIGN PATENT DOCUMENTS

| JP | 57-142677 | 9/1982 |
|---|---|---|
| JP | 60-144569 | 9/1985 |
| JP | 63-12470 | 1/1988 |

(Continued)

OTHER PUBLICATIONS

English Language Abstract of JP 2000-272524.

(Continued)

*Primary Examiner*—Paul N. Dickson
*Assistant Examiner*—Drew J. Brown
(74) *Attorney, Agent, or Firm*—Greenblum & Bernstein, P.L.C.

(57) ABSTRACT

A tilt steering apparatus for a vehicle includes a lower steering shaft of which low end being mounted with a steering gear, an upper steering shaft of which top end being mounted with a steering wheel, a universal joint that joints a top end of the lower steering shaft with a low end of the upper steering shaft, a lower column member fixed to a vehicle body to support the lower steering shaft to be pivotable, an upper column member that supports the upper steering shaft to be pivotable, and a tilt lock mechanism that tilt-locks the upper column member to the lower column member. The top end side of the upper column member is closed.

16 Claims, 9 Drawing Sheets

FOREIGN PATENT DOCUMENTS

| | | |
|---|---|---|
| JP | 63-52666 | 4/1988 |
| JP | 64-51567 | 3/1989 |
| JP | 3-112468 | 11/1991 |
| JP | 6-1110 | 1/1994 |
| JP | 8-230687 | 9/1996 |
| JP | 10-138934 | 5/1998 |
| JP | 11-129914 | 5/1999 |
| JP | 11-198819 | 7/1999 |
| JP | 11-208483 | 8/1999 |
| JP | 11-268654 | 10/1999 |
| JP | 2000-272524 | 10/2000 |

OTHER PUBLICATIONS

English Language Abstract of JP 11-268654.
English Language Abstract of JP 11-208483.
English Language Abstract of JP 11-198819.
English Language Abstract of JP 11-129914.
English Language Abstract of JP 10-138934.
English Language Abstract of JP 8-230687.

* cited by examiner

[FIG. 1] Prior Art
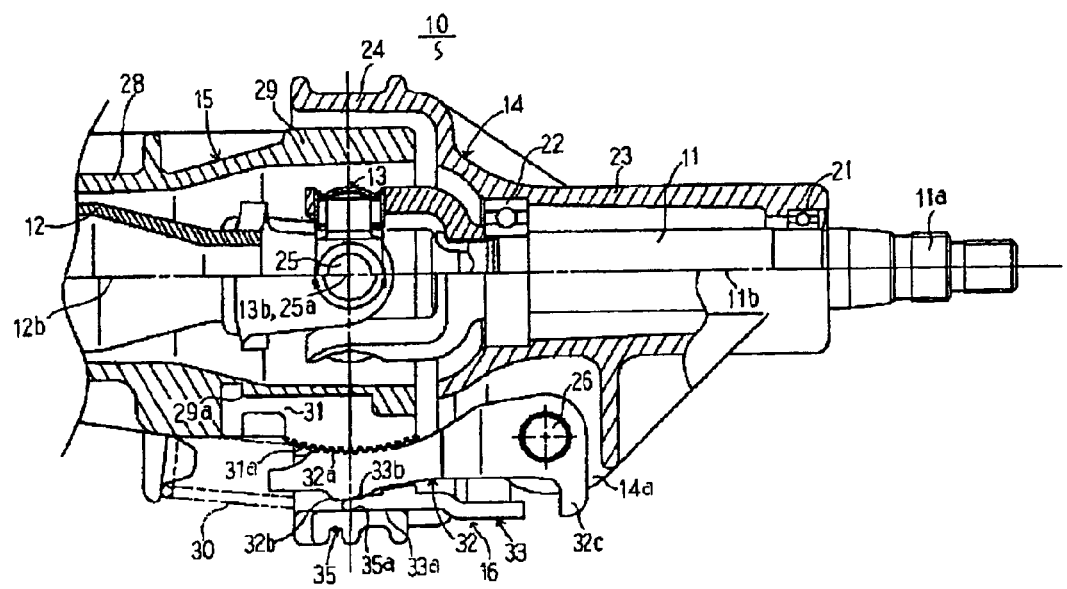
[FIG. 2] Prior Art
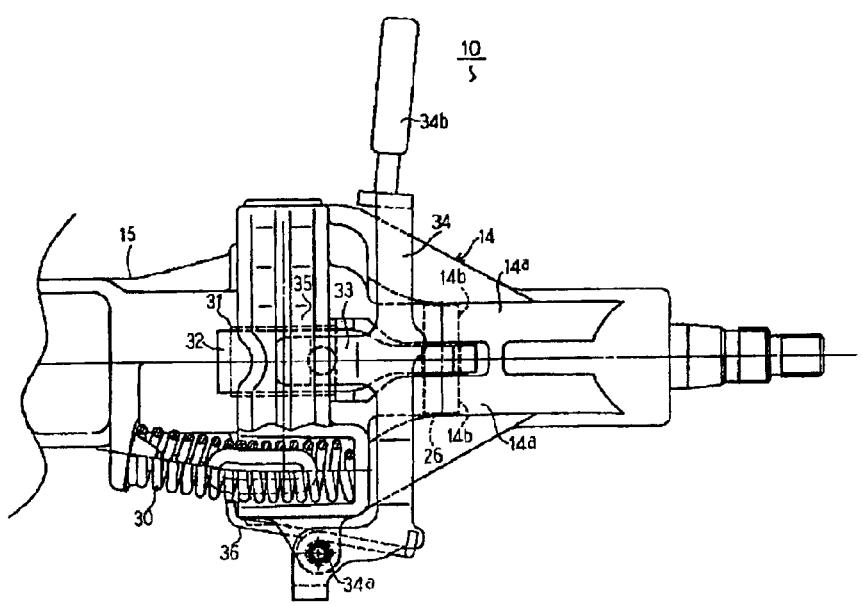

[FIG. 3] Prior Art
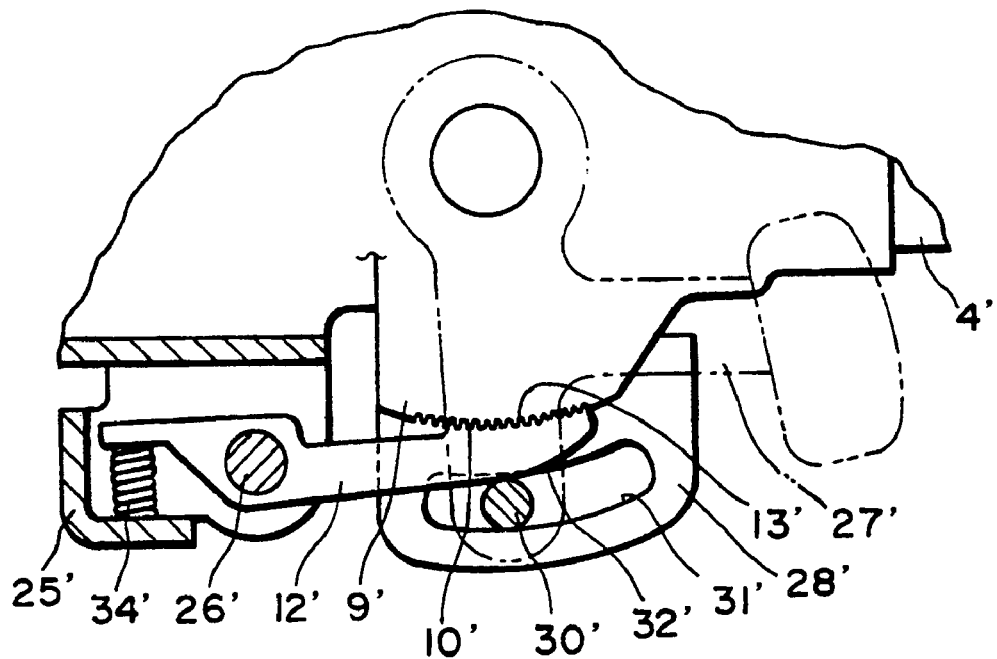
[FIG. 4] Prior Art
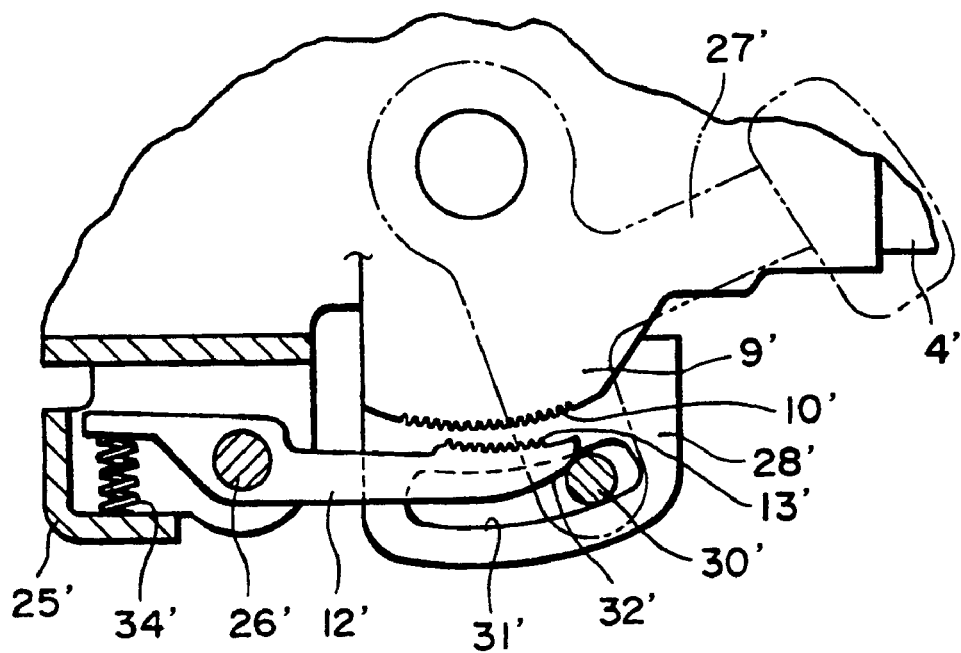

[FIG. 5a]
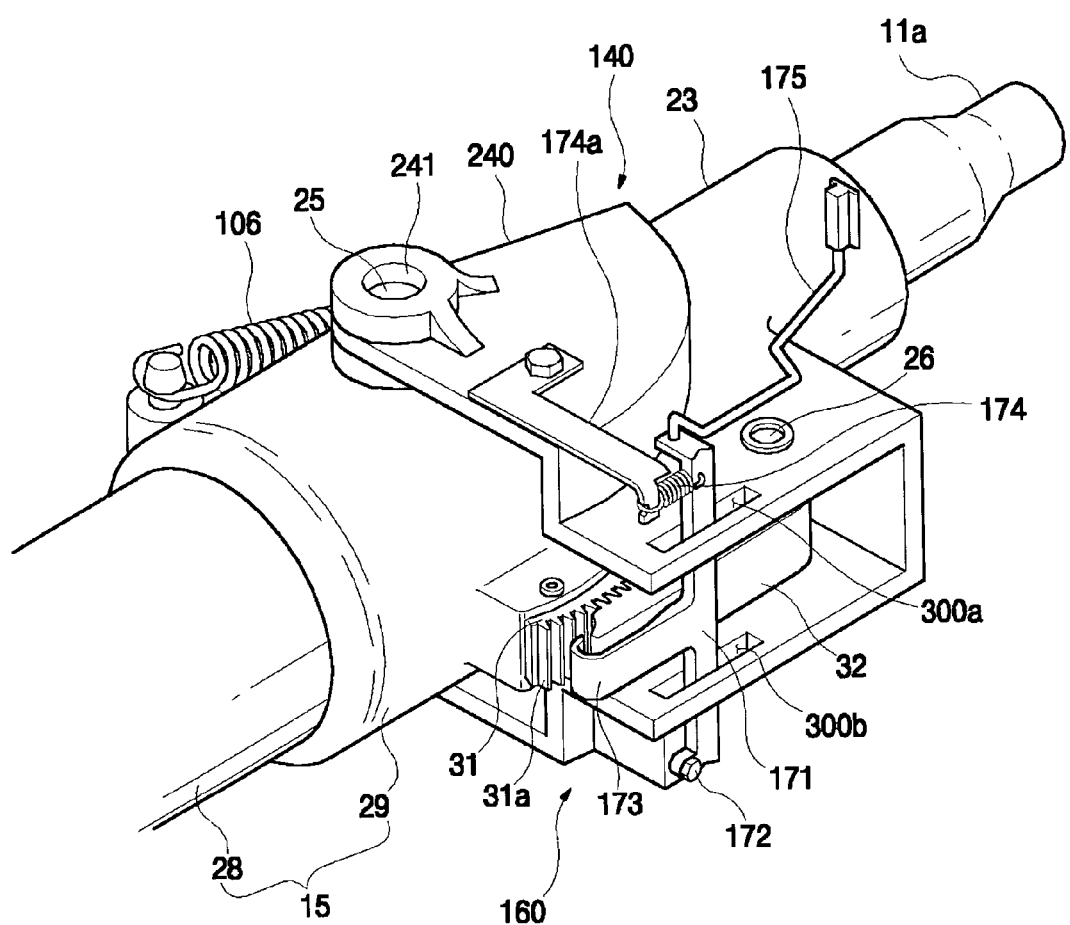

[FIG. 5b]
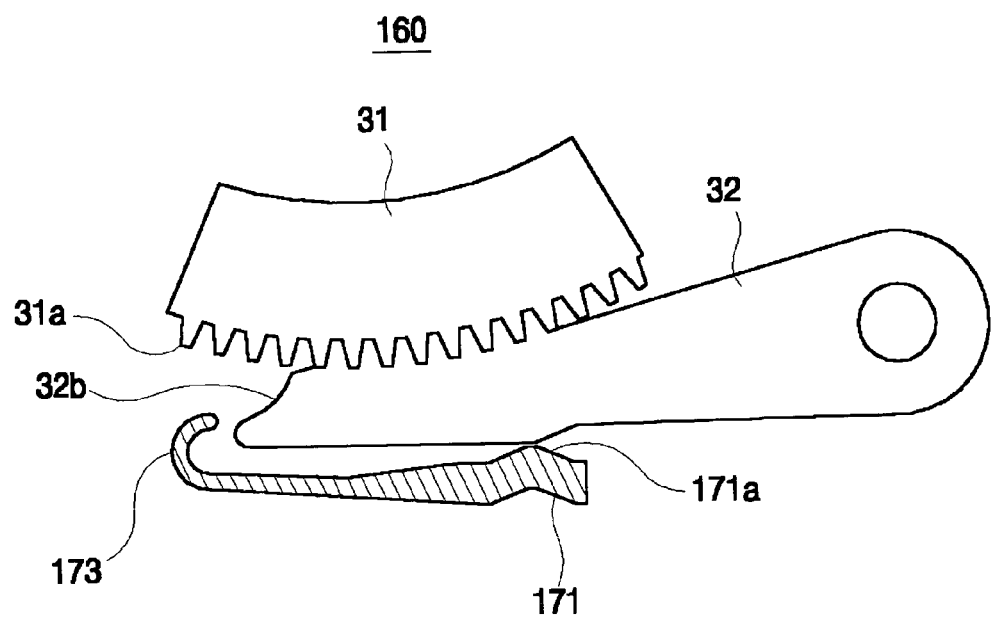

[FIG. 6a]
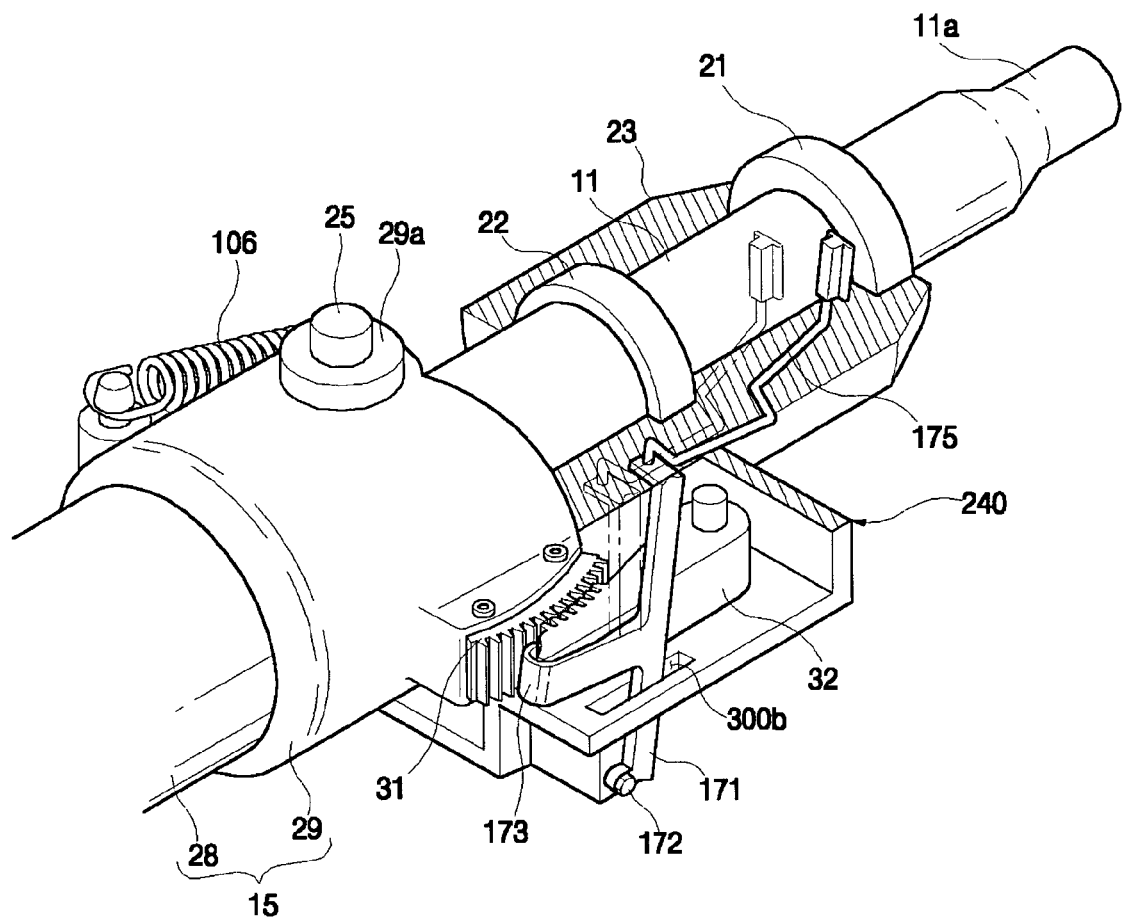

[FIG. 6b]
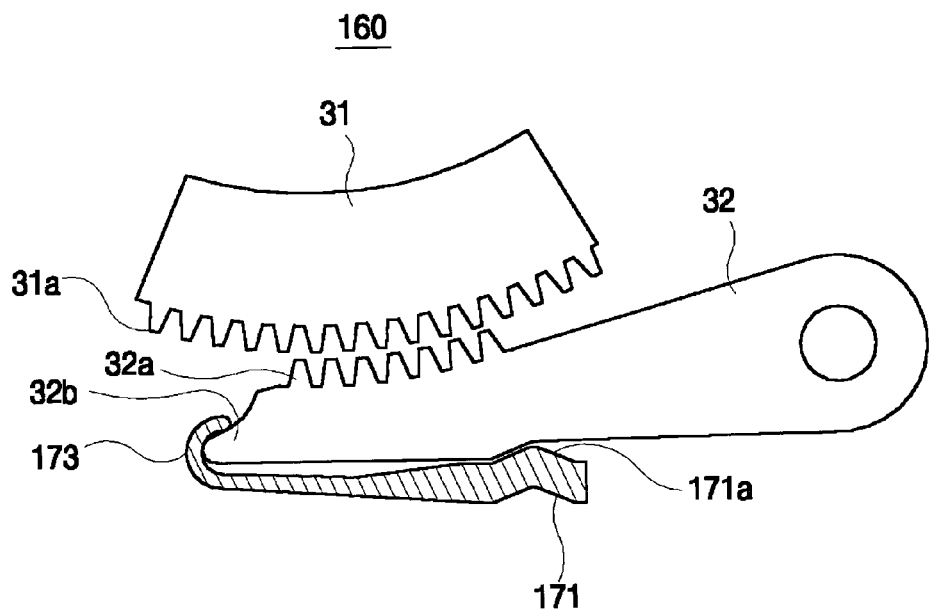
[FIG. 7]
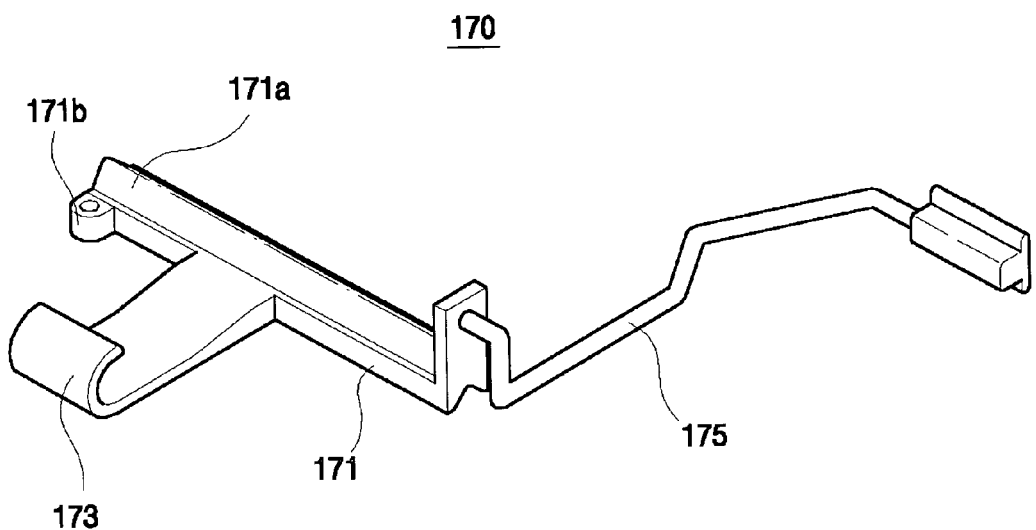

[FIG. 8]
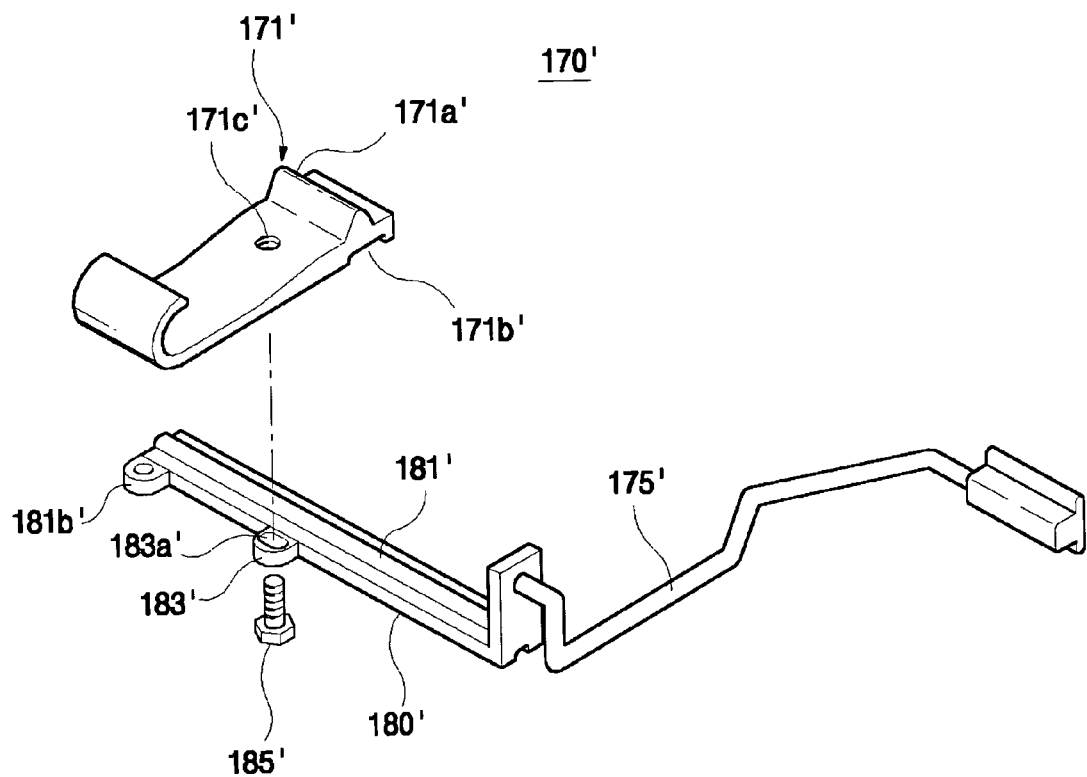

[FIG. 9a]
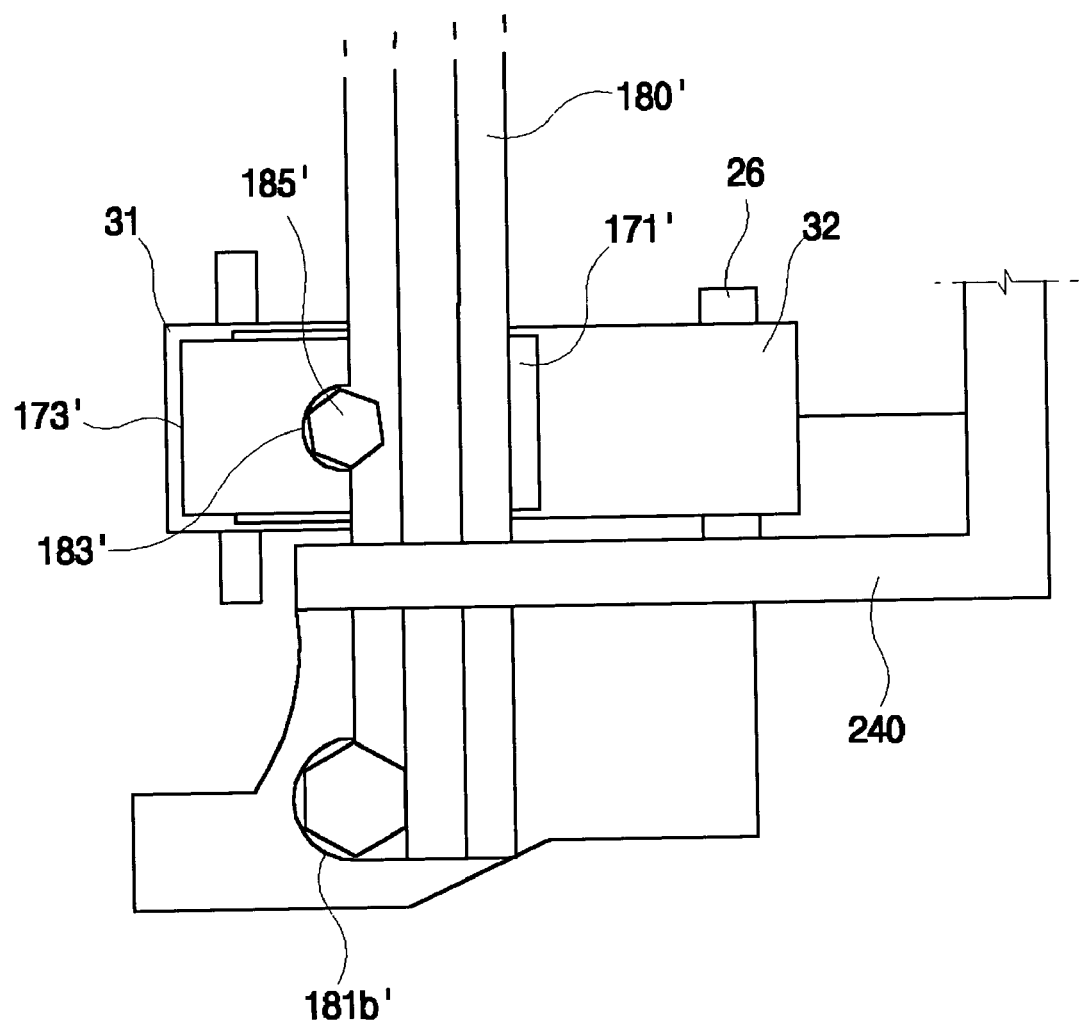

[FIG. 9b]
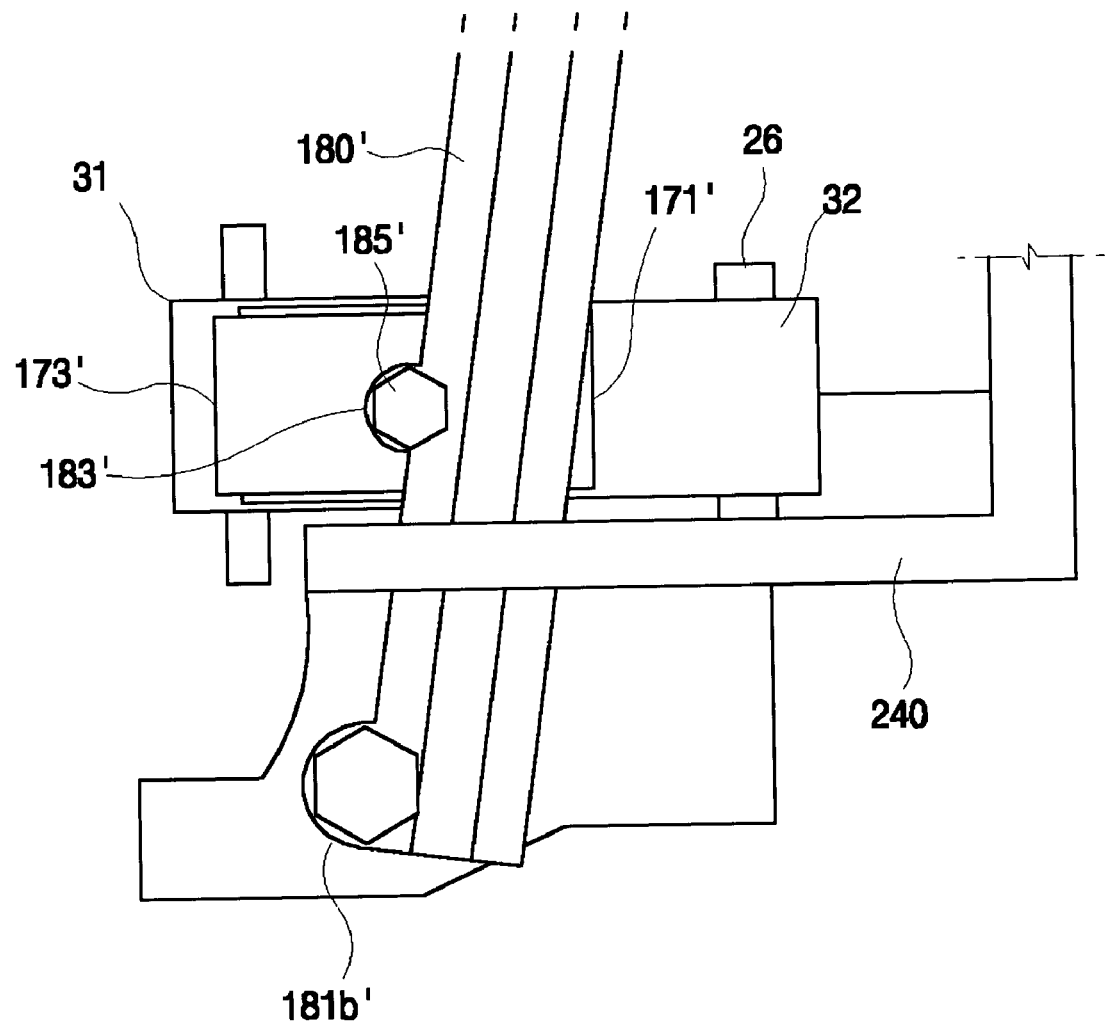

TILT STEERING APPARATUS FOR VEHICLE

The present disclosure is related to the prior foreign application No. 10-2003-38733 filed on 16 Jun. 2003 in Republic of Korea (KR).

BACKGROUND OF THE INVENTION

1. Field of the Invention

The present invention relates to a tilt steering apparatus for vehicle, mounted with a tilt lock mechanism capable of adjusting the height of the steering wheel of the vehicle according to the physical figure (physique) or driving posture of a driver.

2. Description of the Related Art

A tilt steering apparatus mounted with a tilt lock mechanism is disclosed in a number of publications, for example, U.S. Pat. Nos. 6,481,310, 6,282,977, 5,452,624, 5,143,402, 5,078,022, 4,903,540, and 4,892,330; Japanese Patent Publications Nos. 2000-272524, 1999-268654, 1999-208483, 1999-198819, 1999-129914, 1998-138934, 1996-230687; and Japanese Utility Model Publications Nos. 1994-1110, 1991-112468, 1989-51567, 1988-52666, 1988-012470, 1985-144569, and 1982-142677.

The tilt lock mechanism introduced in the above publications is composed of a fixed gear, a movable gear, a wedge member (or lock slider) and a reaction member, which are sequentially disposed perpendicular to an operating plane of the movable gear. In particular, the tilt lock mechanism mounted on the steering apparatus discussed in U.S. Pat. No. 628,977, as shown in FIGS. 1 and 2, is composed of a fixed gear 31, a movable gear 32 upon the fixed gear 31, a wedge member 33 disposed at the lower portion of the movable gear 32 in such a manner to be able to slide, and a reaction member 35 for supporting a bottom surface of the wedge member 33.

With the help of such tilt lock mechanism, the movable gear 32 is locked or released as follows. Referring to FIG. 1 first, if a tilt lever 34b is rotated clockwise, a protruded portion 32b of the wedge member 33 correspondingly slides to the right side, and the movable gear 32 is released from the tooth coupling to the fixed gear 31. When the lock is released, an upper column member 15 is tilted with respect to a lower column member 15 so as to set the steering wheel at an appropriate height. On the other hand, if the tilt lever 34b is freed, the tilt lever 34b is rotated counter-clockwise by a spring 30, and the wedge member 33 slides to the left side, sliding in-between the movable gear 32 and the reaction member 35, and pushes the movable gear 32 up to be toothed on the fixed gear 31. In this way, the height of the steering wheel can be adjusted as desired.

However, the tilt lock mechanism discussed above has the following defects.

First of all, the manufacturability of the tilt lock mechanism is low, in other words, the work of manufacturing has a low efficiency, because the reaction member with a complicated shape needs to be interruptedly formed to the upper column member 15.

Secondly, since a protrusion 32c is disposed at the top end side of the movable gear 32, when the gear is unlocked, the protrusion 32c is usually exposed from the upper column member 14 to be pivoted. This often hurts the driver's knee(s). Although a manufacturer might try to set the upper column member 14 near to the driver's seat in order to prevent the protrusion 32c from being exposed from the upper column member 14, this only makes the space around the driver's knees smaller, interfering the driving.

Thirdly, although the tilt lever 34b is in a position for locking the movable gear 32, if the tilt lever 34b rotates more or less than it is supposed to in the locking position because of a minor error in the manufacture of components, or if the tilt lever 34b rotates, the wedge member 33 coupled to the tilt lever 34b as one body rotates in a horizontal direction and at the same time, does the vertical rectilinear motion. As a result, the protruded rear surface 32b of the movable gear 32 and the wedge member 33 inevitably make a point contact, not a line contact, and thus the supporting rigidity and abrasion resistance of both components is deteriorated.

Fourthly, because the protruded portion on the lower end of the wedge member 33 is too little, a heavy load is often placed on the wedge member 33 for breaking or disengaging the pivotable from the fixed gear. This is actually the major cause of changes in operational load or overload on the tilt lever for lock release, i.e. disengaging the gears from each other. As a result, the operability of the tilt lever is substantially lowered.

As an attempt to resolve the above problems, U.S. Pat. No. 5,143,402 disclosed a modified tilt lock mechanism as illustrated in FIGS. 3 and 4. The tilt steering apparatus in this invention is comprised of a fixed gear 9', a movable gear 12', plates 28' with a circular arc-shaped slot 31', disposed at the both sides of the movable gear 12' and the fixed gear 9', a shaft 30' to be inserted into the slot 31', and a tilt lever 27' for driving the shaft 30'.

This tilt lock mechanism 30', by the operation of the tilt lever 27', translates vertically while rotating in the horizontal direction at the same time. As such, the rear surface of the movable gear 12' and the shaft 30' make the point contact, not the line contact, and this consequently deteriorates supporting rigidity and abrasion resistance.

Also, the slot 31' in a circular-arc shape makes the work of manufacturing more difficult.

SUMMARY OF THE INVENTION

It is, therefore, an object of the present invention to provide a tilt steering apparatus for vehicle with a simple manufacturing process, capable of securing an enough space for a driver's knees are likely to be.

Another object of the present invention is to provide a tilt steering apparatus for a vehicle having a physical constitution that can improve the operability or efficiency of the work of manufacture by minimizing the operational load on a tilt lever.

Still another object of the present invention is to provide a tilt steering apparatus for a vehicle having a physical constitution that can improve the supporting rigidity and abrasion resistance of a tilt lock mechanism overall.

To achieve the above object, there is provided a tilt steering apparatus for a vehicle, including: a lower steering shaft of which low end being mounted with a steering gear; an upper steering shaft of which top end being mounted with a steering wheel; a universal joint that joints a top end of the lower steering shaft with a low end of the upper steering shaft; a lower column member fixed to a vehicle body that supports the lower steering shaft to be pivotable; an upper column member that supports the upper steering shaft to be pivotable; and a tilt lock mechanism that tilt-locks the upper column member to the lower column member, wherein the top end side of the upper column member is closed and the tilt lock mechanism includes: a fixed gear attached to the lower column member; a movable gear attached to a top end side of the upper column member in such a manner to be pivotable; slots perforated on both sides (left and right) of the upper column member; and a wedge member disposed at the slots to tooth-lock the movable gear to the fixed gear by pressing the movable gear.

The advantages of the above constitution are that the area around a driver's knees becomes spacious, and the apparatus can be easily manufactured.

Preferably, a hook piece is further mounted on the wedge Preferably, a hook piece is further mounted on the wedge member to encompass a lower end side of the movable gear. As a result, the operational load on the tilt lever can be minimized, and the operability thereof can also be enhanced.

In the embodiment, the wedge member includes: a wedge piece mounted on the hook piece; a groove formed on a rear surface of the wedge piece; a plate disposed at the slot; and a protrusion formed on a front surface of the plate to be fit in the groove. Here, the protrusion is loosely slid in the groove, whereby the movable gear and the wedge member can have the line contact with each other. In this manner, the supporting rigidity and the abrasion resistance of both components can be improved.

Moreover, the wedge piece is attached to the plate in such a manner to be able to rotate back and forth. Hence, the line contact between the movable gear and the wedge member is secured.

If a rear end side of the upper column member on which the tilt lock mechanism is mounted is closed, the strength of the upper column member is increased.

BRIEF DESCRIPTION OF THE DRAWINGS

The above objects, features and advantages of the present invention will become more apparent from the following detailed description when taken in conjunction with the accompanying drawings, in which:

FIG. 1 is a side cross-sectional view of a tilt steering apparatus in a related art;

FIG. 2 is a bottom view of the tilt steering apparatus in FIG. 1;

FIG. 3 is a side view of another related art tilt steering apparatus being locked;

FIG. 4 is a side view of the unlocked tilt steering apparatus in FIG. 3;

FIG. 5a is a perspective view of an outside of a tilt steering apparatus where a movable gear is locked in accordance with a preferred embodiment of the present invention;

FIG. 5b is a schematic cross-sectional view of a tilt-locking state in FIG. 5a;

FIG. 6a is a perspective view of an outside of a tilt steering apparatus where a movable gear is unlocked in accordance with a preferred embodiment of the present invention;

FIG. 6b is a schematic cross-sectional view of an unlocked state in FIG. 6a;

FIG. 7 is a perspective view of a tilt lever means;

FIG. 8 is a perspective view of another tilt lever means in accordance with another embodiment of the present invention;

FIG. 9a is a bottom view of the state in which the movable gear is locked by operation of the tilt lever means in FIG. 8; and FIG. 9b is a bottom view of the state in which the movable gear is unlocked by operation of the tilt lever means in FIG. 8.

DETAILED DESCRIPTION OF THE PREFERRED EMBODIMENT

A preferred embodiment of the present invention will be described herein below with reference to the accompanying drawings. Like reference numerals designate like parts in the related art. In the following description, well-known functions or constructions are not described in detail since they would obscure the invention in unnecessary detail.

In DETAILED DESCRIPTION and CLAIMS, directions, e.g. vertical, horizontal, back and forth etc., will be determined based on a driver who actually operates a steering wheel. For instance, in FIG. 5, the right side is designated as 'top' or 'upper', the left side as 'bottom' or 'lower', the upper side as 'fore' or 'front', the lower side as 'back', the visible side as 'left' and the invisible side as 'right'.

Preferred Embodiment 1

FIG. 5a is a perspective view of an outside of a tilt steering apparatus where a movable gear is locked in accordance with a preferred embodiment of the present invention; FIG. 5b is a schematic cross-sectional view of a tilt-locking state in FIG. 5a; FIG. 6a is a perspective view of an outside of a tilt steering apparatus where a movable gear is unlocked in accordance with a preferred embodiment of the present invention; FIG. 6b is a schematic cross-sectional view of an unlocked state in FIG. 6a; and FIG. 7 is a perspective view of a tilt lever means.

As depicted in FIGS. 5a through 7, the tilt steering apparatus 100 of the present invention is composed of an upper steering shaft 11, a lower steering shaft 12, a universal joint 13, an upper column member 140, a lower column member 15, and a tilt lock mechanism 160, each of the components serving to transfer the behavior (or motion) of a steering wheel (not shown) in a vehicle to wheels (not shown).

Particularly, the upper steering shaft 11 is used for mounting the steering wheel (not shown) on a steering wheel mounting portion 11a. In addition, the universal joint 13 is mounted on the lower end of the upper steering shaft 11 (refer to FIG. 1). On the top and bottom portions of the upper steering shaft 11 are bearings 21 and 22 to be inserted between the upper column member 140 and the upper steering shaft 11.

A steering gear (not shown) is fixed to the lower end of the lower steering shaft 12. For example, in case of a Rack pinion type steering apparatus, a steering rack is toothed to the steering gear. The steering rack is again coupled to the wheels through tie rod, ball joint, knuckle arm and the like. Connected to the top end portion of the lower steering shaft 12 is the universal joint. The lower steering shaft 12 is pivotable to every direction with the help of the bearing (not shown) inserted between the lower column member 15 and the lower steering shaft 12.

The universal joint 13, as illustrated in FIG. 1, is inserted between the lower end of the upper steering shaft 11 and the upper end of the lower steering shaft 12, making both steering shafts 11 and 12 be flexibly connected to each other. Thanks to this universal joint, the rotation of the upper steering shaft 11 following the rotation of the steering wheel is readily transferred to the lower steering shaft 12, even when a core 11b of the upper steering shaft 11 and a core 12b of the lower steering shaft 12 are dislocated from each other, that is, when the core 11b of the upper steering shaft 11 is inclined to the core 12b of the lower steering shaft 12. Here, a straight line passing through the cross point of those two cores 11b and 12b is designated as the center 13b of the universal joint 13, and this center 13b corresponds to a core 25a of the tilt shaft 25.

The upper column member 140 is composed of a cylindrical column main body 23, and an upper bracket 240 fixed to the lower end of the column main body 23. A passing hole 241 is punched to both sides of the upper bracket 240, respectively, and the tilt shaft 25 is embedded in the passing hole 241. The core 25a of the tilt shaft 25 passes through the center 13b of the universal joint 13. A hole is also formed on both sides of the upper bracket 140, respectively. In this hole, a pin 26, on which a movable gear 320 (this will be described later) is pivoted, is inserted. In fact, this pin 26 is part of a tilt lock mechanism 160 which will be described later. Also, a slot 300a or 300b is punched on the both sides (left and right) of the upper bracket portion 240. Since the slots 300a and 300b are punched like a vertically straight line, their manufacturing is considered very easy. These slots 300a and 300b are also part of the tilt lock mechanism 160 which will be described later. In the meantime, the top end portions of the both sides of the upper bracket portion 240 are closed, making the shape of '⊃'. The entire upper column member 140 supports the rotation of the upper steering shaft 11 with the help of bearings 21 and 22, each being inserted between the top end of the column main body 23 and the upper steering shaft 11, and between the top end of the upper bracket 240 and the upper steering shaft 11. Further, the entire upper column member 15 is supported by the tilt shaft 25 in such a manner to be able to pivot upon the lower column member 15.

The lower column member 15 is composed of a column main body 28 and a cylindrical portion 29 in one body. The cylindrical portion 29 includes a support portion 29a that supports the cylindrical portion 29 to be inserted in the upper bracket 240. To this end, the tilt shaft 25 is embedded in the support portion 29a. The column main body 28, on the other hand, is fixed to an instrument panel (not shown) of a vehicle through a mounting portion (not shown). The entire lower column member 15, through a bearing (not shown), supports the lower steering shaft 12 to make it pivotably move. Also, the upper column member 140 and the lower column member 15 are interconnected to each other by a spring 106. Because of this spring 106, a spring force is applied to the fore part of the upper column member 140 against the lower column member 15, centering around the tilt shaft 25. This spring force is supposed to facilitate the adjustment of steering wheel's height by offsetting the weights of the upper steering shaft 11, the upper column member 140, and the steering wheel.

Major components of the tilt lock mechanism 160 include a fixed gear 31 attached to the lower column member 15, a movable gear 32 attached to the upper column member 140, a carrier screw bar 330, an operating member 340 for rotating the carrier screw bar 330, a pin 26, and a female screw 250.

The fixed gear 31 is a member on a block fixed to the rear surface of the cylindrical portion 29 by the pin, and a fixed toothed portion 31a is formed on the rear surface of this block 31, making a circular arc around the tilt shaft 25.

The movable gear 32 is another member on the block, whose upper end side is pivotably movable by the pin 26 that is embedded in the upper column member 140. A movable toothed portion 32a to be engaged with the fixed toothed portion 31a is formed on the front surface of this block 320. Also, a tilt protrusion 32b is formed on the rear end side of the movable gear.

The tilt lever means 170 largely consists of a wedge member 171 which passes through both slots 300a and 300b, and a tilt lever 175 disposed at the right end side of the wedge member 171. On the other hand, a hinge portion 171b is disposed at the left end side of the wedge member 171 in such a manner that it is pivotably movable on the lateral axis 172 about the upper bracket portion 240. A protrusion 171a is formed on the front surface of the wedge member 171. If this protrusion 171a is positioned on the lower side of the rear surface of the movable gear 32, as shown in FIG. 5b, the protrusion presses the driving gear 32 to make sure the gears are locked to each other. As FIG. 6b illustrates, if the protrusion 171a is positioned on the upper side of the rear surface of the movable gear 32, however, the movable gear 32 is disengaged from the fixed gear.

To make sure the disengagement of the movable gear, the tilt lever means 170 further includes a hook piece 173 extended from the wedge member 171 upwardly. When the wedge member 171 pivots upwardly, the hook piece 173 encompasses the tilt protrusion 32b of the movable gear 32 and forcefully disengages the movable gear 32. Since the hook piece 173 is disposed at the lower side of the upper bracket portion 240, it is possible to close the top end side of the upper bracket portion 240, and the upper bracket portion 240 gets more distant from the driver's knees. Not only it is easy to manufacture this type of upper bracket portion 240, but also there is no need to add another member for protecting the driver's knees because the area around the driver's knees is spacious enough. In addition, the tilt protrusion 32b that is located at a similar position to the movable gear 32 plays a key role in improving the operability of the tilt lock mechanism by minimizing the load while disengaging the movable gear and minimizing changes in operational load on the tilt lever 175.

Preferably, an elastic spring 174 is attached to the wedge member 171. As shown in FIG. 5a, the elastic spring 174 is attached to a supporting bracket portion 174a mounted on the upper bracket portion 240 and to the wedge member 171. According to this construction, the tilt lever 175 can be easily locked.

The operation of the tilt steering apparatus 100 for a vehicle is now explained.

To ensure that the wedge piece 171" makes the line contact with the plate 180' and is not split from the plate 180', it is preferable to install an additional locking member. The locking member, as shown in FIG. 8, includes a female screw 171c' mounted on the wedge piece 171', a locking plate 183' mounted on the center of the plate 180', and a bolt 185' to be locked with the female screw 171c'. At this time, a horizontally elongated hole 183a' is punched on the locking plate 183a'. This long hole 183a' is primarily for helping the rotation of the wedge piece 171' in the horizontal direction, and thus keeping the line contact.

When the tilt lever 341 is released after the steering wheel is set at an appropriate height, the tilt lever is rotated clockwise by the elastic spring 174, and the wedge member 171 and the hook piece 173 return to their original positions. In other words, the hook piece 173 is separated from the tilt protrusion 32b, and the protrusion 171a presses the movable gear 32. As a result, the movable gear 32 moves upwardly. In this manner, the fixed gear 31 and the movable gear 32 are toothed to each other, being tilt locked (refer to FIGS. 5a and 5b). In this state, the upper column member 140 is locked to the lower column member 15, and the adjustment of the steering wheel's height is completed.

Preferred Embodiment 2

In case of the Exemplary Embodiment 1, the wedge member 171 and the tilt lever 175 were combined to each other as one body, so when the gears are disengaged, the wedge member 171 remains in a rotational state, and the rear surface of the movable gear 32 and the protrusion 171a make the point contact, resultantly deteriorating the supporting rigidity and the durability (or abrasion resistance) of both components. With a view to resolving the above problems, a split tilt lever means 170' is included in this present embodiment.

FIG. 8 is a perspective view of another tilt lever means in accordance with another embodiment of the present invention; FIG. 9a is a bottom view of the state in which the movable gear is locked by operation of the tilt lever means in FIG. 8; and FIG. 9b is a bottom view of the state in which the movable gear is unlocked by operation of the tilt lever means in FIG. 8.

Referring to FIG. 8, the tilt lever means 170' is composed of a wedge piece 171', a hook piece 173' combined to the wedge piece 171' as one body, a plate 180' disposed at both slots 300a and 300b, and a tilt lever 175'.

Similar to the Exemplary Embodiment 1, a hinge 181b is attached to the left end side of the plate 180', and a tilt lever 175' is attached to the right end side of the plate 180'. On the front surface of the plate 180' is protruded upwardly, forming a convex protrusion 181'. Meanwhile, a groove 171'b is formed on the rear surface of the wedge piece 171'. The protrusion 181' loosely fits in (or slides in) this groove 171'b.

With this physical constitution, if the tilt lever 175', that has been locked as in FIG. 9a, is pulled, the plate 180' pivots on the hinge 181b'. When the plate 180' pivots, the protrusion 181' is correspondingly pivoted. Since the protrusion 181' plays in the groove 171'b, the wedge piece 171' becomes vertically straight as illustrated in FIG. 9b. As such, the movable gear 32 and the protrusion 171a' of the wedge piece 171' always make the line contact with each other, and through this phenomenon, the supporting rigidity and the abrasion resistance of both components can be enhanced.

To ensure that the wedge piece 171' makes the line contact with the plate 180' and is not split from the plate 180', it is preferable to install an additional locking member. The locking member, as shown in FIG. 8a, includes a female screw 171c' mounted on the wedge piece 171', a locking plate 183' mounted on the center of the plate 180', and a bolt 185' to be locked with the female screw 171c'. At this time, a horizontally elongated hole 183' is punched on the locking plate 183'. This long hole 183' is primarily for helping the rotation of the wedge piece 171' in the horizontal direction, and thus keeping the line contact.

In conclusion, the tilt steering apparatus for a vehicle according to the present invention can be advantageously used for the following reasons.

First, manufacturing the tilt lock mechanism for tilt locking an upper column member about the lower column member, wherein the top end side of an upper column member thereof is closed, in such a design that includes a fixed gear mounted on the rear side of the lower column member, a movable gear being supported to the top end of the upper column member in such a manner to be vertically pivotable about the upper column member, slots punched on both sides (the left and right sides) of the upper column member, and a wedge member positioned in the slots for tooth-locking the movable gear to the fixed gear by pressing the movable gear, it became much easier to manufacture the upper column member, and no additional part for protecting the driver's knees is required.

Second, installing a hook piece in the wedge member for encompassing the lower end of the movable gear, the operational load on the tilt lever is minimized and thus, the operability of the tilt lever is much improved. Moreover, because the hook piece is positioned at the lower end of the movable gear, the closed top end of the upper column member gets more distant from the driver's knees, thereby securing more space around the driver's knees.

Third, the wedge member is preferably composed of a wedge piece to which the hook piece is attached, a groove formed on the rear surface of the wedge piece, a plate to be inserted to the slots, and a protrusion formed on the front surface of the plate so as to be fit in the groove. As the protrusion loosely sides in the groove, the movable gear and the wedge member make the line contact with each other, and as a result thereof, the supporting rigidity and the abrasion resistance can be improved.

Fourth, since the wedge piece is coupled to the plate in such a manner that it can rotate back and forth, the movable gear and the wedge piece keep their line contact, and the wedge piece is not easily split.

Fifth, closing the rear end of the upper column member on which the tilt lock mechanism is mounted, the strength of the upper column member is increased.

While the invention has been described in conjunction with various embodiments, they are illustrative only. Accordingly, many alternative, modifications and variations will be apparent to persons skilled in the art in light of the foregoing detailed description. For example, as discussed above, if the rear end of the upper bracket portion 240 is closed, the strength of the entire upper column member 140 can be increased. The foregoing description is intended to embrace all such alternatives and variations falling with the spirit and broad scope of the appended claims.

What is claimed is:

1. A tilt steering apparatus for a vehicle, comprising:
   a lower steering shaft of which low end being mounted with a steering gear;
   an upper steering shaft of which top end being mounted with a steering wheel;
   a universal joint that joints a top end of the lower steering shaft with a low end of the upper steering shaft;
   a lower column member fixed to a vehicle body to support the lower steering shaft to be pivotable;
   an upper column member that supports the upper steering shaft to be pivotable; and
   a tilt lock mechanism that tilt-locks the upper column member to the lower column member, wherein the top end side of the upper column member is closed, the tilt lock mechanism comprising:
   a fixed gear attached to the lower column member;
   a movable gear attached to a top end side of the upper column member in such a manner to be pivotable;
   slots perforated on both sides (left and right) of the upper column member; and
   a wedge member disposed in the slots to tooth-lock the movable gear to the fixed gear by pressing the movable gear,
   wherein the wedge member is configured to pivotally move, and a hook piece extending from the wedge member is configured to directly engage the movable gear.

2. The apparatus according to claim 1, wherein the hook piece extending from the wedge member encompasses a lower end side of the movable gear.

3. The apparatus according to claim 2, wherein the wedge member comprises:
a groove formed on a rear surface of the wedge piece;
a plate disposed at the slot; and
a protrusion formed on a front surface of the plate to be fit in the groove.

4. The apparatus according to claim 3, wherein the protrusion is loosely received in the groove.

5. The apparatus according to claim 4, wherein the wedge piece is attached to the plate in such a manner to be able to rotate back and forth.

6. The apparatus according to claim 1, wherein a rear end side of the upper column member on which the tilt lock mechanism is mounted is further closed.

7. The apparatus according to claim 2, wherein a rear end side of the upper column member on which the tilt lock mechanism is mounted is further closed.

8. The apparatus according to claim 3, wherein a rear end side of the upper column member on which the tilt lock mechanism is mounted is further closed.

9. The apparatus according to claim 4, wherein a rear end side of the upper column member on which the tilt lock mechanism is mounted is further closed.

10. The apparatus according to claim 5, wherein a rear end side of the upper column member on which the tilt lock mechanism is mounted is further closed.

11. A tilt steering apparatus for a vehicle, comprising:
a lower steering shaft of which low end being mounted with a steering gear;
an upper steering shaft of which top end being mounted with a steering wheel;
a universal joint that joints a top end of the lower steering shaft with a low end of the upper steering shaft;
a lower column member fixed to a vehicle body to support the lower steering shaft to be pivotable;
an upper column member that supports the upper steering shaft to be pivotable; and
a tilt lock mechanism that tilt-locks the upper column member to the lower column member, wherein the top end side of the upper column member is closed, the tilt lock mechanism comprising:
a fixed gear attached to the lower column member;
a movable gear attached to a top end side of the upper column member in such a manner to be pivotable;
slots perforated on both sides (left and right) of the upper column member;
a wedge member disposed at the slots to tooth-lock the movable gear to the fixed gear by pressing the movable gear;
wherein the wedge member comprises:
a wedge piece mounted on a hook piece;
a groove formed on a rear surface of the wedge piece;
a plate disposed at the slot; and
a protrusion formed on a front surface of the plate to be fit in the groove; and
wherein the hook piece extends from the wedge member to encompass a lower end side of the movable gear.

12. The apparatus according to claim 11, wherein the protrusion is loosely received in the groove.

13. The apparatus according to claim 12, wherein the wedge piece is attached to the plate in such a manner to be able to rotate back and forth.

14. The apparatus according to claim 11, wherein a rear end side of the upper column member on which the tilt lock mechanism is mounted is further closed.

15. The apparatus according to claim 14, wherein a rear end side of the upper column member on which the tilt lock mechanism is mounted is further closed.

16. The apparatus according to claim 13, wherein a rear end side of the upper column member on which the tilt lock mechanism is mounted is further closed.

* * * * *